US007890392B1

(12) United States Patent
Butcher, III (10) Patent No.: US 7,890,392 B1
(45) Date of Patent: Feb. 15, 2011

(54) METHOD OF STRUCTURING A CREDIT HAVING A REPAYMENT OBLIGATION

(75) Inventor: George H. Butcher, III, New Rochelle, NY (US)

(73) Assignee: Goldman Sachs & Co., New York, NY (US)

(*) Notice: Subject to any disclaimer, the term of this patent is extended or adjusted under 35 U.S.C. 154(b) by 1154 days.

(21) Appl. No.: 09/823,376

(22) Filed: Mar. 30, 2001

Related U.S. Application Data (60) Provisional application No. 60/256,017, filed on Dec. 15, 2000.

(51) Int. Cl.
*G06Q 40/00* (2006.01)

(52) U.S. Cl. .......................................... 705/35; 705/38

(58) Field of Classification Search .................. None
See application file for complete search history.

(56) References Cited

U.S. PATENT DOCUMENTS

| | | | | |
|---|---|---|---|---|
| 6,315,196 B1* | 11/2001 | Bachman | ..................... | 235/380 |
| 2002/0016758 A1* | 2/2002 | Grigsby | ...................... | 705/36 |

OTHER PUBLICATIONS

Canadian Market Benefits Less From CPI News, Financial Post. (Jun. 15, 2000), p. 2.*
Ainger, Will. XL Capital Preps Cat Bond Debut, Insurance Finance & Investment. v. 4, n. 11 (May 31, 1999), p. 1.*

Livingston, M. Bonds & Bond Derivatives. Massachusetts, Blackwell Publishers, 1999. pp. 25-26.*
Merriam-Webster's Collegiate Dictionary: 10th Edition Massachusetts, Merriam-Webster, 1997, p. 455.*
O'Shaughnessy, Lynn. The Unofficial Guide to Investing. New York, Macmillan General Reference, 1999, p. 152.*
Shinn, Paul. Bond Banks & Revolving Loan Funds, Government Finance Review. Chicago: Jun. 1988, vol. 4, issue 3, pp. 36-37.*
E. Scott Reckard Associated Press. Holders of County's Bonds Vote to Extend Maturities, The Fresno Bee. Fresno, California (Jul. 8, 1995) p. 4.*
Rowen, Hobart. Debt Relief Gets a Cautious Nod, The Washington Post. (Oct. 8, 1987) p. A23.*

(Continued)

*Primary Examiner*—Jason M Borlinghaus
(74) *Attorney, Agent, or Firm*—Walter G. Hanchuk; Chadbourne & Parke LLP (57) ABSTRACT

In one embodiment a method of structuring a credit having a repayment obligation is provided, including: setting an expected maturity date and a final maturity date for the credit; requiring that the repayment obligation be met by the expected maturity date unless at least one predefined event occurs; and requiring that the repayment obligation be met by the final maturity date to the extent that the repayment obligation is not met by the expected maturity date. In another embodiment a method of structuring a bond issued by a bond issuer, wherein the bond has associated therewith a repayment obligation, is provided, including: setting an expected payment date and a legal maturity date for the bond; requiring that the bond issuer establish revenue rates sufficient to pay the repayment obligation by the expected payment date; and deferring the payment of the repayment obligation as late as the legal maturity date to the extent that the repayment obligation is not met by the expected payment date.

16 Claims, 4 Drawing Sheets

OTHER PUBLICATIONS

Flaum, David. New Types of Bonds Hold Some Twists, Orange County Register. Santa Ana, Claifornia (Oct. 3, 1988), pp. c1 & c12.*
Downes, John and Goodman, Jordan Elliot. Barron's Finance and Investment Handbook. New York, Barron's Educational Series, 1987, p. 215.*
Bella, Rick. Sewer Rates Likely to Rise. The Oregonian. Portland, Oregon (Jul. 17, 2000) p. E02.*
Brigham, Eugene F., Gapenski, Louis C. & Daves, Phillip R. Intermediate Financial Management 6th Edition. Dryden Press, 1999. p. 392.*
Pearson, Clare. Three-Year Dollar Bonds Find Favour, Financial Times. (Apr. 17, 1986) p. 38.*
Anonymous. Leveraged Funding, Euromoney. (Jul. 1986) p. MA14.*
Lebenthal, James A. Municipal Bonds Need to Be Made a Part of President's Program to 'Rebuild' Nation, Bond Buyer. New York, NY. vol. 393, iss. 29090 (Feb. 16, 1993) p. 26.*
McEvoy, Marty. Municipal Bonds Do Have Investment Risks, State Journal Register. Springfield, Illinois. (May 14, 1995) p. 48.*
Miller, Gerald J. Handbook of Debt Management. Marcel Dekker. 1996. p. 260 & 418.*
Gaines, George Jr; Coleman, David S; Crawford, Linda L. Real Estate Math. Dearborn Real Estate Education. 1996. p. 107.*
Paulson, Ed. The Complete Idiot's Guide to Buying & Selling a Business. Alpha Books. 1999. pp. 75-76.*
Vin Suprynowicz, States to sell 'tobacco bonds'?.enterstageright. com, May 8, 2000; pp. 3, 1-3.
Jill Vihtelic, Could Tobacco Bonds Go Up in Smoke?, BusinessWeek, Nov. 22, 1999.Energy & Min. L. Inst. Ch. 8 (2001), pp. 270-317.
Super Sinker, Investopdia.com, Oct. 6, 2002, pp. 2, 1-2.
Super Sinker Bond, Investorwords.com Oct. 6, 2002, p. 2.
William Stuart Morgan III, South Counties Join in Unique Financing Venture for Landfill Development, County News Online, National Association of Counties-Washington, D.C. vol. 29, No. 11 Jun. 9, 1997.
"Corporate Trust Connection" Newsletter, Winter 1999 (U.S. Bank Corporate Trust Services).
"Investing Glossary": Supper Sinker Bond, Market Volume, Oct. 6, 2002.

* cited by examiner

METHOD OF STRUCTURING A CREDIT HAVING A REPAYMENT OBLIGATION

CROSS-REFERENCE TO RELATED APPLICATIONS

This application claims the benefit under 35 U.S.C. 119(e) of U.S. Provisional Application Ser. No. 60/256,017, filed Dec. 15, 2000

FIELD OF THE INVENTION

The instant invention relates to a method of structuring a credit having a repayment obligation. The repayment obligation may have an expected maturity or payment date and a final (or legal) maturity or payment date.

BACKGROUND OF THE INVENTION

For many municipal credits (such as loans, bonds, securities, or other obligations) the risk of default is principally a risk of a delay in payment ("timing risk") rather than a risk that the obligation will never be paid ("ultimate payment risk"). This is recognized by many of the rating agencies in their treatment of State Revolving Fund ("SRF") pools. For example, STANDARD & POORS assumes that if a default occurs it will last for four years, after which the credit issuer will resume making payments until maturity. In the SRF context, the four-year period is applied to all credits without regard to any issuer specific facts. In other words, the four-year period is applied whether the credits are non-investment grade or "AA", for example. Consequently, it is believed that four years can be viewed as the outside limit of timing risk for investment grade credits (and arguably the risk period should be shorter for "A" or better credits).

While there are a number of existing mechanisms designed to address the issue of timing risk, it is believed that none of them does so in the context and manner of the instant invention.

Among those benefits and improvements that have been disclosed, other objects and advantages of this invention will become apparent from the following description taken in conjunction with the accompanying figures. The figures constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment, a method of structuring a credit having a repayment obligation is provided, comprising: setting an expected maturity date and a final maturity date for the credit; requiring that the repayment obligation be met by the expected maturity date unless at least one predefined event occurs; and requiring that the repayment obligation be met by the final maturity date to the extent that the repayment obligation is not met by the expected maturity date.

The credit may have an underlying revenue stream associated therewith and the predefined event may be the failure of the revenue stream to cover the requirements of the repayment obligation. The failure of the revenue stream to cover the requirements of the repayment obligation may result from a force majure event. The revenue stream may flow from a project selected from the group including: i) an airport project; and ii) a sewer project.

The credit may be issued as part of a pool of credits. The pool of credits may be associated with a state revolving fund program.

Additional interest on a principal portion of the repayment obligation which is not met by the expected maturity date may continue to accrue until the principal portion of the repayment obligation is met. The additional interest may be paid using a mechanism selected from the group including: i) accretion of principal to the principal portion of the repayment obligation in the amount of the unpaid additional interest; ii) direct payment of the additional interest; and iii) an increase in the interest rate on any unpaid part of the principal portion of the repayment obligation calculated to result in a payment increase substantially equal the additional interest. The increase in the interest rate on any unpaid part of the principal portion of the repayment obligation may increase in each year following the expected maturity date.

Additional interest on an interest portion of the repayment obligation which is not met by the expected maturity date may continue to accrue until the interest portion of the repayment obligation is met. The additional interest may be paid using a mechanism selected from the group including: i) accretion of principal to a principal portion of the repayment obligation in the amount of the unpaid additional interest; ii) direct payment of the additional interest; and iii) an increase in the interest rate on any unpaid part of the principal portion of the repayment obligation calculated to result in a payment increase substantially equal the additional interest. The increase in the interest rate on any unpaid part of the principal portion of the repayment obligation may increase in each year following the expected maturity date.

The credit may be a bond. The revenue stream may be a net revenue stream.

In another embodiment, a method of structuring a bond issued by a bond issuer, wherein the bond has associated therewith a repayment obligation is provided, comprising: setting an expected payment date and a legal maturity date for the bond; requiring that the bond issuer establish revenue rates sufficient to pay the repayment obligation by the expected payment date; and deferring the payment of the repayment obligation as late as the legal maturity date to the extent that the repayment obligation is not met by the expected payment date.

The bond may have an underlying revenue stream associated therewith and the deferral of the payment of the repayment obligation may occur upon the failure of the revenue stream to cover the requirements of the repayment obligation. The failure of the revenue stream to cover the requirements of the repayment obligation may result from a force majure event. The revenue stream may flow from a project selected from the group including: i) an airport project; and ii) a sewer project.

The step of requiring that the bond issuer establish revenue rates sufficient to pay the repayment obligation by the expected payment date may further comprise requiring that the bond issuer establish revenue rates sufficient to pay both the repayment obligation by the expected payment date and legally payable debt service.

The deferral of the payment of the repayment obligation may occur upon the occurrence of an objectively determinable event. The objectively determinable event may be the existence of a predetermined shortfall between: i) the sum of the repayment obligation and legally payable debt service; and ii) revenues raised by the revenue rates established by the bond issuer. The step of requiring that the bond issuer establish revenue rates sufficient to pay the repayment obligation by the expected payment date may be a continuing requirement even if the repayment obligation is deferred. The step of requiring that the bond issuer establish revenue rates sufficient to pay the repayment obligation by the expected payment date may further comprise establishing a revenue requirement based on a lower coverage ratio than is used for purposes of either a board policy associated with the bond or a rate covenant associated with the bond. The coverage ratio may be greater than 1.

The bond may be issued as part of a pool of bonds. The pool of bonds may be associated with a state revolving fund program.

Additional interest on a principal portion of the repayment obligation which is not met by the expected payment date may continue to accrue until the principal portion of the repayment obligation is met.

The additional interest may be paid using a mechanism selected from the group including: i) accretion of principal to the principal portion of the repayment obligation in the amount of the unpaid additional interest; ii) direct payment of the additional interest; and iii) an increase in the interest rate on any unpaid part of the principal portion of the repayment obligation calculated to result in a payment increase substantially equal the additional interest. The increase in the interest rate on any unpaid part of the principal portion of the repayment obligation may increase in each year following the expected payment date.

Additional interest on an interest portion of the repayment obligation which is not met by the expected payment date may continue to accrue until the interest portion of the repayment obligation is met. The additional interest may be paid using a mechanism selected from the group including: i) accretion of principal to a principal portion of the repayment obligation in the amount of the unpaid additional interest; ii) direct payment of the additional interest; and iii) an increase in the interest rate on any unpaid part of the principal portion of the repayment obligation calculated to result in a payment increase substantially equal the additional interest. The increase in the interest rate on any unpaid part of the principal portion of the repayment obligation may increase in each year following the expected maturity date.

The revenue stream may be a net revenue stream.

In summary, a first embodiment of the instant invention may operate as follows. The holder of a credit can increase the probability of payment by the issuer in accordance with the terms of the credit (and therefore improve the rating of the credit) by accepting certain risks traditionally borne by the issuer that would otherwise create a possibility of a default in the payment of the credit at maturity (i.e., timing risk) and therefore constrain the credit rating. Such credits shall hereinafter be referred to as Owner Enhanced Credits ("OECs").

In this first embodiment of the instant invention OECs provide a means by which provisions are imbedded directly into credits such that credit holders in effect provide credit enhancement: a) for their own credits; or b) for the credits of others; or c) through which issuers can enhance a portion of their credits in connection with primary market distribution. As described herein, OEC holders may enhance the rating of the credit by accepting timing risk in the event that revenues are insufficient (in spite of the issuer being obligated, pursuant to a rate covenant or other provisions, to raise sufficient revenues) to pay the OEC at the original maturity date (which under the OEC mechanism becomes the "expected" maturity date).

In one example, an OEC according to the first embodiment of the invention may be advantageously issued in particular situations that include revenue bonds that are payable from the revenues of a project or system of projects, such as airport bonds or water and sewer bonds ("system revenue bonds").

Typically, the ratings on even the strongest airport bonds or water and sewer bonds are generally constrained to the "AA" category because of the possibility of damage to the project resulting from a force majure event that could interrupt the ability of the project to provide the services that are the source of its revenues. This rating constraint exists even though the occurrence of such an event in connection with a major airport or water and sewer system is believed to occur very rarely. Moreover, the occurrence of such an event in connection with a major airport or water and sewer system wherein the event resulted in the non-payment of an issuer's bonds is believed to occur even more rarely. In fact, if such an event should occur, bondholders would likely derive protection from the existence of casualty insurance and business interruption insurance as well as from the debt service reserve fund ("DSRF"), which is usually funded at a level sufficient to pay debt service for one year in the event the issuer had no revenues available to pay debt service.

In any case, suppose that an airport revenue bond is rated "AA" rather than "AAA" because of project risk. If, according to the first embodiment of the instant invention, a bondholder were to agree to accept a substantial delay in payment (designed to allow the issuer time to repair or reconstruct the project and to generate revenues again) solely in the event that the revenues of the issuer are insufficient as a result of such force majure event then the bond in our example would have a "final" maturity that reflected the possibility of delay and an "expected" maturity that would be applicable except in the event of an insufficiency resulting from the occurrence of such a force majure event. It is believed that the expected maturity could be rated "AA" and the final maturity could be rated "AAA".

It is noted that a reason for potential resistance to payment extension as a remedy to project risk could be a question whether the issuer has, within its debt structure, the ability to finance the required project repairs if its revenues are interrupted as a result of a force majure event. However, in the SRF context, for example, the four-year payment delay assumption is used equally for revenue and general obligation issuers. Consequently, it is believed that the four-year period is implicitly sufficient to allow an issuer to finance and complete needed repairs and to restructure debt if necessary so that revenues will be sufficient to pay operating costs and debt service and that its rates and charges will be at an acceptable level. In fact, it is believed that most large revenue bond issuers have plenty of additional senior debt capacity to deal with such an emergency. Of course, the issuer should have the authority to finance operating deficits, including debt service, during a period in which revenues were interrupted.

In the first embodiment of the instant invention discussed above the issuer may structure an entire issue as OECs where the bondholders are required to accept the project risk in order to purchase bonds (wherein the yield on all of the issuer's bonds could reflect the included provisions). In a second embodiment of the instant invention the issue could be structured so that the bondholder could either purchase the bond with bond insurance or could purchase the bond as an OEC with the risk of a delay in payment if a force majure event were to occur (wherein purchase of the bond as an OEC may provide additional yield). In either case, the bondholders should have "AAA" bonds. As compensation for purchase of the bond as an OEC, the bondholder could receive: (i) the same interest coupon as other traditional bonds of the same "maturity" (i.e., final maturity in the case of the traditional bond and expected maturity in the case of the OEC); plus (ii) an additional interest coupon. The additional interest coupon could be less than the bond insurance premium so that the issuer could achieve a lower all in cost of funds from the OEC (as compared to a traditional bond). Given the slight risk to the bondholder from accepting the risk of the OEC (in that: (i) it is believed that the risk has rarely materialized in actuality; and (ii) even if the event should occur, the consequence would likely be a delay in payment, not non-payment), there should be little concern with selling OECs to suitable retail buyers. In this regard, a buyer that would be suitable to buy the underlying traditional bond should be suitable to purchase the OEC. If OECs are sold directly to retail, it is believed that pressure would mount for mutual funds to purchase them in order to be competitive with the yields directly available to retail buyers.

It is noted that interest on the principal amount payable on the expected payment date could (to the extent principal was unpaid) continue to accrue. This is similar to the case of a traditional bond structure. However, interest could also be paid on any unpaid interest. In this respect the holders of OECs would be treated better than traditional bondholders. The payment of interest on interest could take a variety of forms, including, for example: (a) accretion of principal in the amount of any unpaid interest; (b) payment of interest on unpaid interest; and (c) an increase in the interest rate on unpaid principal calculated to have the same effect as interest on unpaid interest (the interest rate could increase in each year following the expected maturity date).

In another example, an OEC according to a third embodiment of the instant invention may be advantageously issued if the rating constraint went beyond simple project risk. That is, if the rating constraint involved some broader credit concerns that might affect the timing of payment of the bonds, it might still be possible for the OEC mechanism of the instant invention to enhance the rating to "AAA" if, rather than being limited to project risk, the bondholder accepted the risk of nonpayment whenever net revenues were insufficient to pay debt service on the issuer's bonds. The issuer could still be obligated pursuant to a rate covenant, for example, to raise sufficient revenues to pay operating expenses and to meet the coverage requirement (e.g. 1.25×) on debt service, including amounts payable on the OECs to the extent of available funds. The OEC holder could still seek specific performance of the issuer's obligations under the rate covenant. Thus, the credit risk relating to payment on the original payment date of the bond (i.e., the expected maturity date of the OEC) is unchanged. Accordingly, here, as with the other embodiments of the instant invention, it is believed that the OEC structure would not facilitate or be conducive to any deterioration of the credit. However, if the available revenues were still insufficient to pay amounts otherwise due on the OEC then the issuer would not be in default and the payment date of the OEC bonds would be extended for up to a specified period of time (or until the revenues were sufficient, if earlier).

It is noted that since the issuer would have a continuing obligation on and after the expected maturity date to raise sufficient revenues to pay the OEC, the probability of payment by the final maturity date would be higher than the probability of payment on the expected maturity date. If the period between the expected and final maturity dates were sufficiently long, then even a "BBB" municipal general obligation or system revenue bond (for which ultimate payment risk is essentially zero) should be able to be converted into a "AAA" OEC.

It is further noted that the OEC mechanism of the instant invention may be utilized as a type of subordination that can have other applications. That is, on the expected maturity date the OEC is "payable, but only to the extent of available funds". This is different from traditional subordination in which an obligation is payable, but secured by a subordinate lien on the revenues that represent the source of payment. Thus, it would be impossible for an issuer to be insolvent on the expected maturity date because of a payment "due" on its OECs. Traditional subordination has limited benefit to the senior holders because: (i) the existence of subordinate obligations does not decrease the risk of insolvency or bankruptcy; and (ii) in the event of bankruptcy the subordination is not fully respected. On the other hand, it is believed that the existence of OECs has a positive effect on the creditworthiness of the issuer's other obligations since: (a) the OECs, like subordinate bonds, provide additional coverage for the senior obligations; and (b) unlike subordinate bonds, the OECs decrease the possibility of insolvency. Thus, it is believed that each outstanding OEC at least modestly increases the probability of payment of the issuer's other bonds maturing prior to the expected maturity date of each OEC. (The impact on bonds maturing between the expected and final maturity dates is more difficult to gauge. However, by alleviating what might have otherwise been a certain default, an OEC may improve even the creditworthiness of the bonds maturing after the expected maturity date of the OEC.) If a significant portion of an issuer's capital structure constituted OECs then the ratings of the issuer's other bonds may be materially enhanced. This enhancement of other debt is another difference from traditional subordinate debt.

It is further noted that the OEC is in effect subordinated only up to but not including the final maturity date. Thus, unlike traditional subordination, the OEC mechanism of the instant invention reduces insolvency risk. The OEC mechanism of the instant invention also increases the probability of payment on any other bonds maturing before the final maturity date of the OEC and increases the probability of payment of the OEC on or before its final maturity date (as compared to the probability of payment on the expected maturity date). Moreover, the OEC mechanism of the instant invention keeps the pressure on the issuer to make payments on or as soon as possible after the expected maturity date and therefore increases the probability of payment of the OEC on or before the final maturity date of the OEC (as compared to the probability of payment on the expected maturity date).

From a credit perspective, it is believed that the OEC mechanism of the instant invention would appear similar to a term maturity for which the issuer is required to fund an invested sinking fund by making a sinking fund deposit such that the term bond will have been fully defeased by a date significantly prior to the maturity of the term bond. If: (i) the obligation to make sinking fund installments is equivalent to the obligation to pay serial bond maturities and the sinking fund installments are required to be included in the issuer's tax rate or rates and charges; and (ii) the obligation to make the sinking fund deposit occurs sufficiently before the maturity of the term bond, then the credit quality of the term bond (i.e., likelihood of payment on the maturity date) is believed to be superior to the credit quality of a traditional bond.

Referring now to yet another embodiment of the instant invention, a bond may be issued which is legally payable on a date that is later than the date on which the bond is expected to be either paid or defeased. Such a bond shall hereinafter be referred to as an Accelerated Debt Service bond ("ADS bond"). An ADS bond could, for example, have a legal maturity on Jul. 1, 2015 (an "ADS Maturity") but have an expected payment date (an "ADS Payment Date") on Jul. 1, 2012.

An ADS bond according to the instant invention may be used: a) to reduce an issuer's system revenue requirements in order to moderate anticipated rate increases and/or; b) to increase debt service coverage for purposes of the issuer's system rate covenant and/or board rate policy. In one example of the ADS bond embodiment, the principal amount payable on the ADS Payment Date would not be included in the issuer's system rate covenant revenue requirements or in the revenue requirements under the board policies applicable to the issuing system (since the ADS bond would not be legally due on the ADS Payment Date). In fact, in this example, if an ADS bond were retired on the ADS Payment Date the principal thereof would never be reflected in the revenue requirement under either the rate covenant or board rate policy. Thus, the impact of the ADS bonds would be to effectively reduce the issuer's coverage ratio to the lower ADS coverage requirement.

In another example ADS bond according to the instant invention, the issuer would be obligated to raise revenues in an amount sufficient to pay the ADS bond on the ADS Payment Date. However, the revenue requirement could be based on a lower coverage ratio than is used for purposes of either the board policy or rate covenant. For example, for senior lien ADS bonds a coverage ratio of 1.05× might be used. In this example the ADS revenue requirement would be 1.05 times the sum of legally payable senior and junior bond debt service plus expected payments on ADS Payment Dates ("ADS Payments"). It is noted that junior bond debt service should be included to prevent double counting coverage for purposes of both the ADS bond and junior bond coverage requirements.

Because of the ADS coverage requirement of the present example, ADS Payment Dates are not merely expected payment dates but, rather, legally mandated payment dates. However, in the event that revenues are not sufficient to pay both legally payable debt service and ADS Payments (notwithstanding the establishment of rates by the issuer as required by the ADS coverage requirement), all or a portion of the ADS Payments could be deferred, and there would not be a default relating to the ADS bonds. If revenues continued to be insufficient, the ADS Payments could be deferred until the ADS Maturity. In utilizing ADS bonds rather than traditional bonds the ADS Payment Dates could be the dates on which the bonds would have matured if structured as traditional bonds. In one example, the ADS Maturity would be deferred one or more years (the "ADS deferral period"). Thus, the revenue requirements under an issuer's rate covenant or other coverage policies applicable to debt service payable on the ADS Payment Date would be reduced. Accordingly, the issuer could: a) reduce or avoid increasing its rates to take advantage of the reduced revenue requirement; and/or b) maintain revenues as if the bonds were structured as traditional bonds, in which case coverage of legally payable debt service would be higher than without the use of ADS bonds.

ADS bonds may be structured either with or without the participation of the bondholders. Unless the bondholders agree in purchasing their bonds to the deferral of interest, a practical way to achieve the deferral is to push out principal by the desired deferral period or through the use of Capital Appreciation Bonds (hereinafter "CABs", also known as "zero coupon bonds"). Using CABs, ADS bonds could be structured to achieve the desired debt service structure assuming payment on the ADS Payment Dates, but with the CABs and current interest principal maturities legally payable on the ADS Maturity date. It is noted that the term "current interest principal" refers to the principal of bonds that pay interest currently, as compared to CABs or zero coupon bonds that pay no interest on a current basis, but mature in an amount that substantially exceeds their initial amounts. The difference in initial principal amount of the CAB and the accreted principal amount payable at maturity is in effect accumulated interest.

Figure 1:
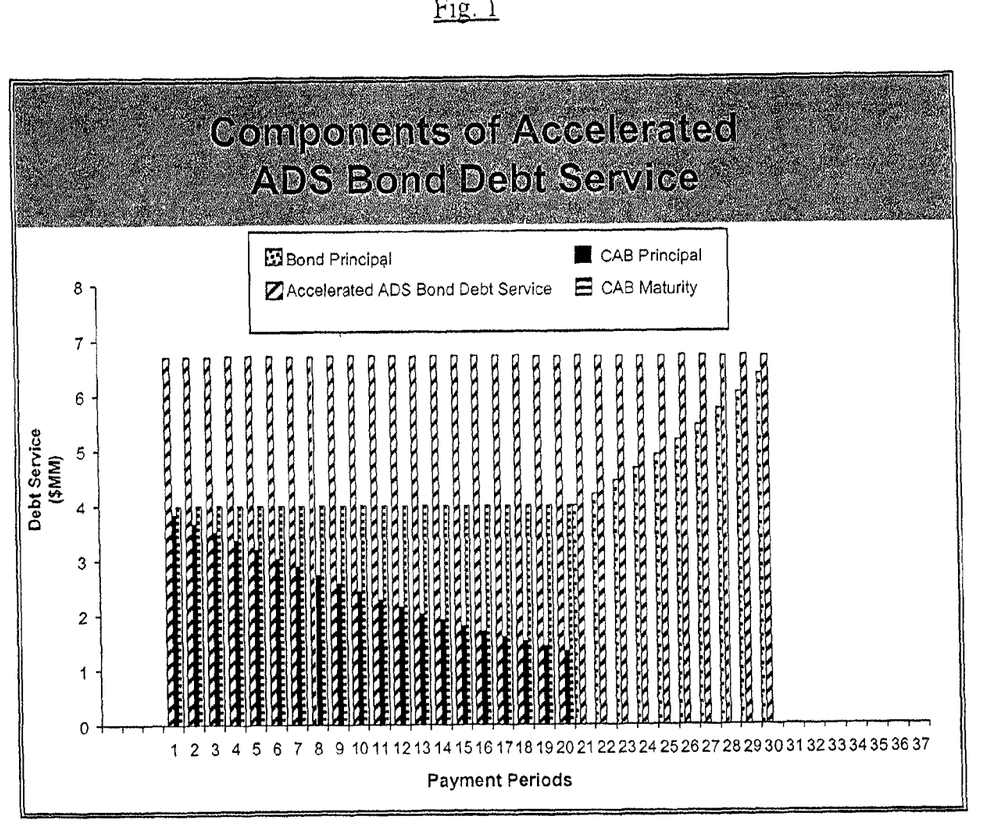
FIG. 1 shows a chart of components of accelerated ADS bond debt service according to an embodiment of the instant invention.
Figure 2:
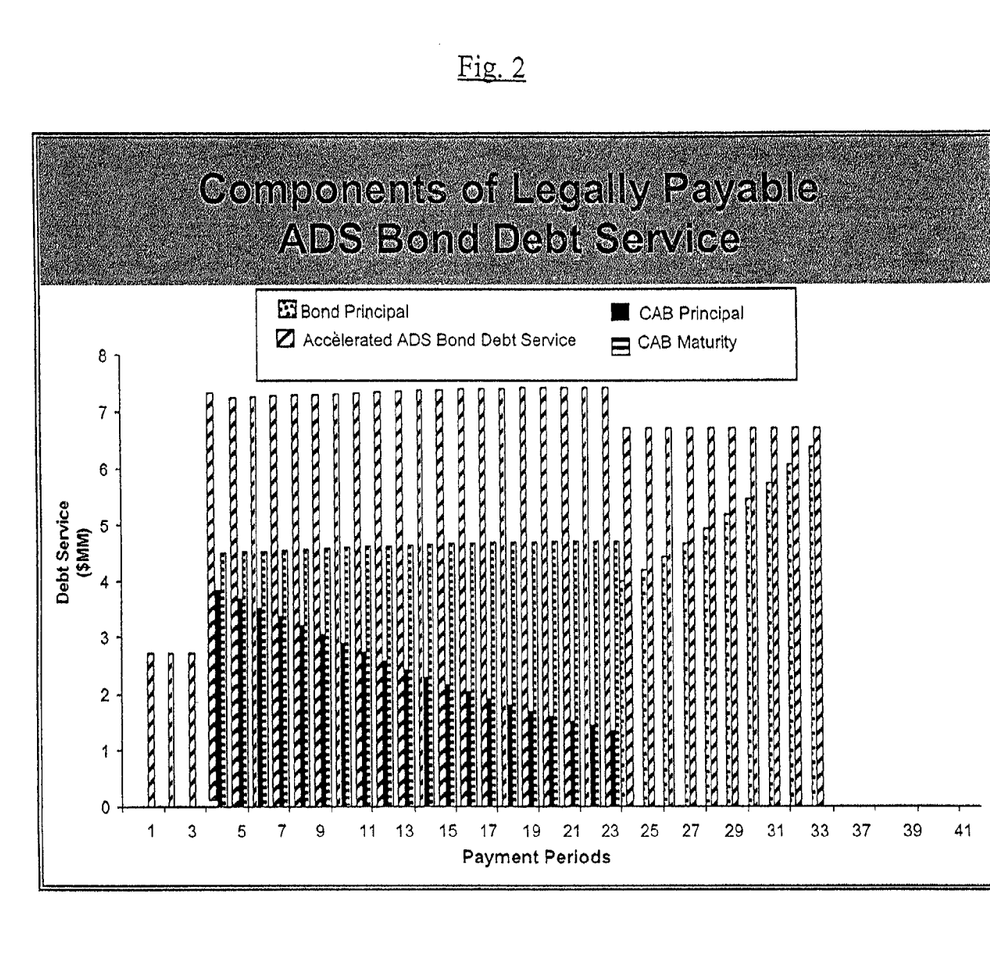
FIG. 2 shows a chart of components of legally payable ADS bond debt service according to an embodiment of the instant invention.

In any case, with respect to one embodiment of the present invention, FIG. 1 illustrates the components of ADS bond debt service payable on the ADS Payment dates and FIG. 2 illustrates the components of ADS bond debt service that would be payable on the ADS Maturity Dates for a bond structure with CAB maturities in years 1 through 20 (a notable difference between FIG. 1 and FIG. 2 is that in FIG. 2 the CABs have continued to acrete for an additional three years). In this example, the ADS bonds are structured to include a 3 year deferral period. Accordingly, rather than having the first maturity in year 1, the first CAB legally matures in year 4.

Other than purchasing bonds maturing on the ADS Maturity date, no concurrence or even awareness by bondholders of the ADS bonds is necessarily required. However, given overwhelming likelihood of payment occurring on the ADS Payment date based on the legal obligation of the issuer to raise revenue sufficiently to meet the ADS coverage requirement, bondholders should be willing to accept lower interest rates for the ADS bonds than the rates applicable to traditional bonds maturing on the ADS Maturity dates. In this regard it is believed (at least in certain circumstances) that only a small interest rate differential between ADS bonds and traditional bonds maturing on the ADS Payment dates would exist.

Another example of the ADS bond embodiment of the instant invention will now be described with reference to the City of Detroit's Water and Sewer System. More particularly, the discussion will focus on the Sewer System, wherein the legally required coverage of ADS bond debt service on the ADS Payment date would be based on the ADS bond coverage requirement rather than on the rate covenant (similarly, the Water Board could interpret its rate policy to exclude ADS Payments). Under this approach, the impact of the ADS bonds could be to substantially reduce the System's overall revenue requirement.

In this regard, it is noted that a recent feasibility report prepared by Black & Veatch for the Sewer System projects substantial rate increases in FY 2002 to FY 2004 (10.39%, 15.35%, and 14.55%, respectively). Increases in bond debt service are a substantial contributing factor to the required revenue increases. Over the aforementioned period, total annual debt service was projected to increase by $73 million to more that $152 million. Based in the board's rate policy, the resulting increase in the Sewer System revenue requirement would be more than $102 million. By including ADS bonds in the System's debt structure as described below, the City could significantly reduce the growth in its revenue requirement to moderate its rate increases.

For any particular ADS bond coverage ratio, the System's revenue requirement will be minimized when the amount of ADS bonds is such that the revenue requirement based on required ADS bond coverage (based on legally payable debt service and ADS Payments, collectively, "Debt Service Payable") is equal to the revenue requirement based on the board rate policy (based solely on legally payable debt service, "Debt Service Due"). Assuming both an ADS bond coverage ratio of 1.05× and a $100 million bond issue, FIG. 2 illustrates the ratio of ADS bond debt service to total debt service at which the ADS bond revenue requirement equals the rate policy revenue requirement and the rate covenant revenue requirement, respectively. It is noted that debt service is abbreviated as "DS" in some places in this FIG. 2.

In any case, the ADS bond percentage of Debt Service Payable at which (1) the board policy revenue requirement based on 1.40× coverage of Debt Service Due equals (2) the ADS bond revenue requirement based on 1.05× coverage of Debt Service Payable, is 42%. So, if ADS Payments equal 42% of Debt Service Payable coverage of Debt Service Due would equal 1.40× and coverage of Debt Service Payable would equal 1.05×. The ADS bond percentage of Debt Service Payable at which (1) the rate covenant revenue requirement based on 1.20× coverage of Debt Service Due equals (2) the ADS bond revenue requirement based on 1.05× coverage of Debt Service Payable, is 21%. So, if ADS payments equal 21% of Debt Service Payable, coverage of Debt Service Due would equal 1.20× and coverage of Debt Service Payable would equal 1.05×.

Figure 3:
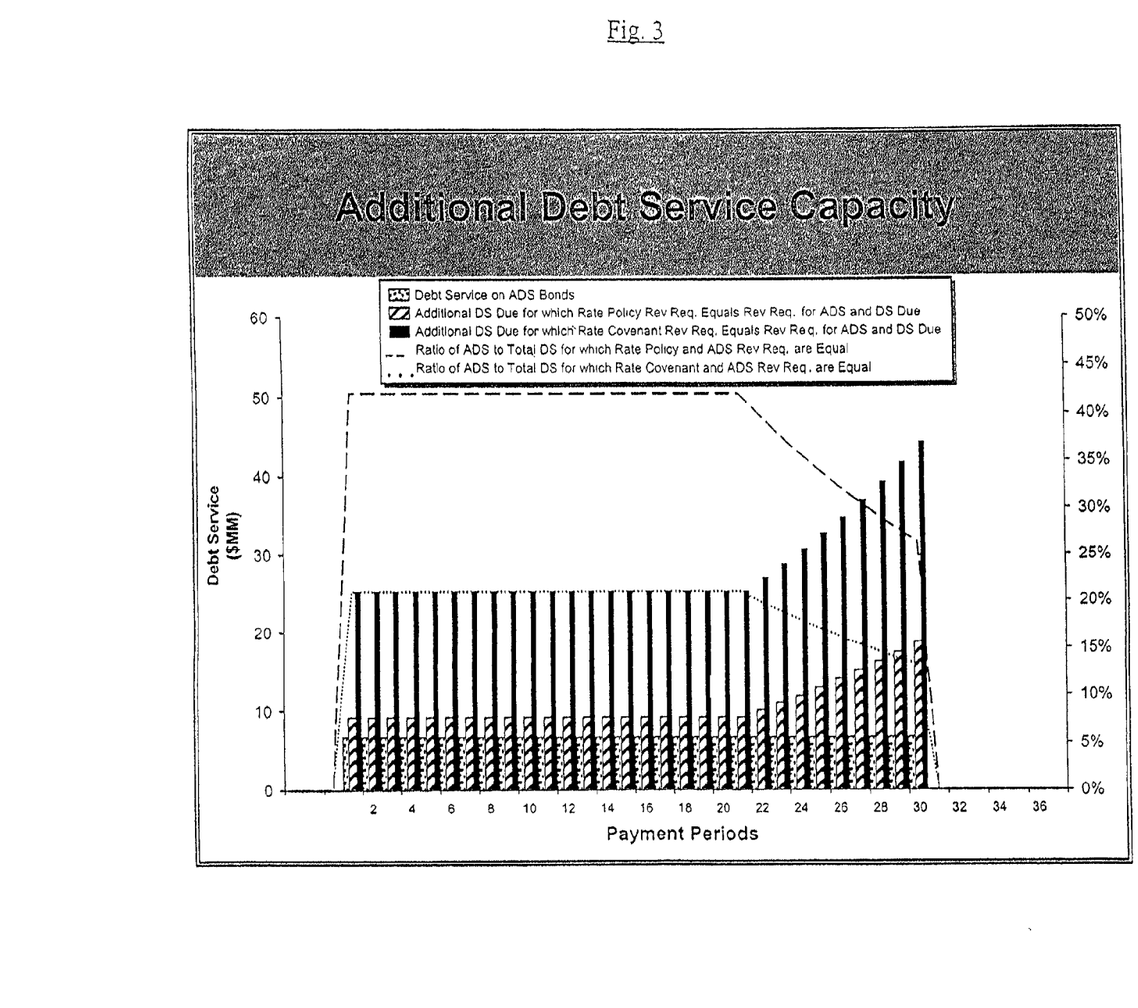
FIG. 3 shows a chart of additional debt service capacity according to an embodiment of the instant invention.
Figure 4:
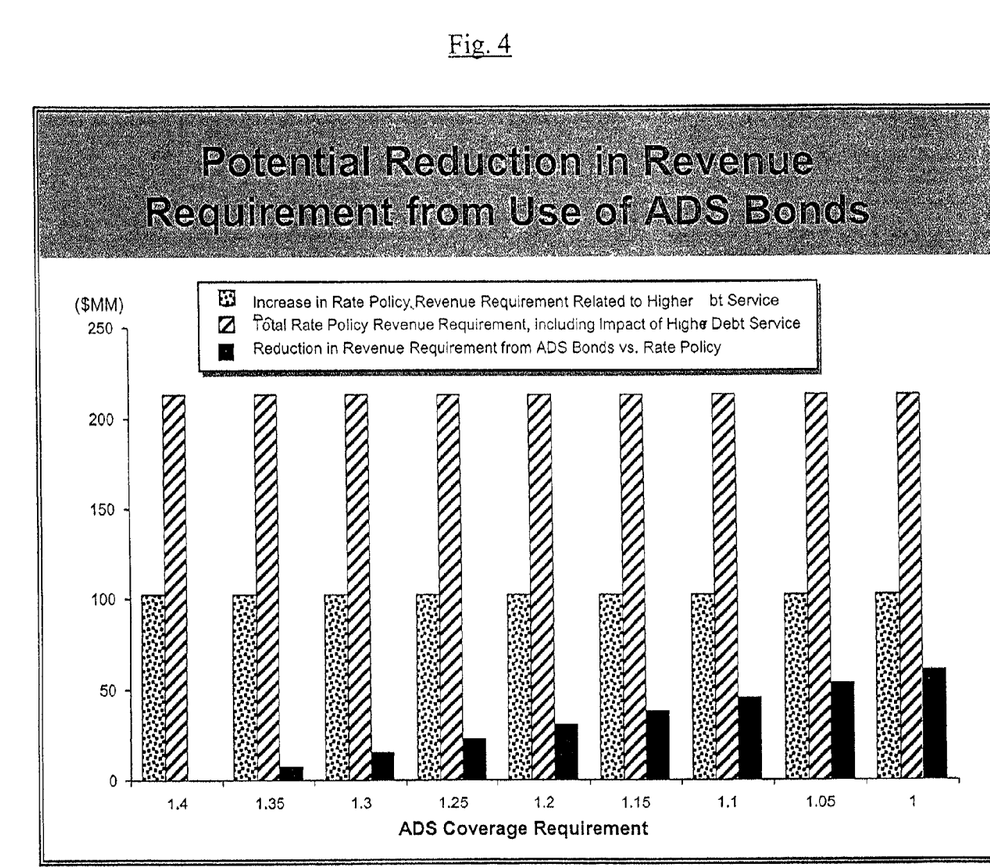
FIG. 4 shows a chart of potential reduction in revenue requirement from the use of ADS bonds according to an embodiment of the instant invention.

FIG. 3 shows the potential reduction in the System's revenue requirement that can be achieved for various ADS bond coverage requirements (assuming the amount of ADS bonds is such that the revenue requirement under the board rate policy equals the revenue requirement applicable to the ADS bonds). Thus, by using ADS bonds to reduce overall coverage of Debt Service Payable to 1.20×, the City could reduce the Sewer System's revenue requirement by approximately $30 million. By using ADS bonds to reduce overall coverage of Debt Service Payable to 1.05×, the City could reduce the revenue requirement for the System by approximately $53 million.

It is believed that in addition to reducing an issuer's revenue requirement or increasing its coverage of Debt Service Due, the use of ADS bonds will generally have a positive impact on an issuer's credit if the period of deferral is sufficient.

If the period of deferral is only one year, for example, the impact of ADS bonds is essentially the same as that of carry-over coverage. The one year deferral would function like a surplus available in the event of a revenue shortfall. If the issuer using a one year deferral period were to reduce debt service coverage by current revenues, the impact would be negligible to slightly negative.

On the other hand, if the period of deferral is longer (e.g., three years), then the issuer has three to four years to address any problems that trigger a revenue shortfall. This period is significant because, in the context of municipal pool financings, the rating agencies typically assume that municipal defaults only last four years. As largely wholesale systems, typical Water and Sewer Systems share several attributes with municipal pools. More particularly, if financial problems were to occur, they would not occur simultaneously to all of the System's customers. As is the case with other pools, such problems would only occur to a subset of customers. Also, as with other municipal pools, the problems should be assumed to last only for a period of up to four years.

In any case, the ADS deferral period would give the System flexibility to deal with such multi-year financial problems (e.g., a multi-year underlying borrower default, including a default by a concentrated borrower). Ironically, the impact of the ADS bond structure is believed to be positive on both the ADS bonds and any traditional bonds in an issuer's debt structure. Since the issuer is legally obligated to raise revenues sufficient to retire the ADS bonds as much as several years prior to the ADS Maturity, the risk of non-payment of the ADS bonds should be lower than the non-payment of traditional bonds. Also, since the period of deferral of the ADS Payments provides unusual flexibility for an issuer to address revenue shortfalls in an orderly manner while continuing to pay Debt Service Due, the credit of the traditional bonds would also be enhanced versus the credit of bonds in an entirely traditional structure. The credit benefit of the ADS bond approach may be moderated to the extent that the ADS bond coverage requirement is below coverage requirements typically found in municipal rate covenants.

Another example of the ADS bond embodiment of the instant invention will now be described in the context of an SRF bond program.

More particularly, an ADS bond of the instant invention may be used in an SRF bond program to enhance the credit of the SRF bond program's bonds either: i) by mitigating the impact on the SRF bond program in the event of a default by an underlying borrower (including a concentrated borrower); and/or ii) by reducing the risk of a default by an underlying borrower. Further, an ADS bond of the instant invention may be used in an SRF bond program to enable certain underlying borrowers to significantly reduce their revenue requirements by using a lower coverage ratio than would otherwise be permissible.

A notable feature of ADS bonds according to the present example is that the ability to defer payment would occur only upon the occurrence of an objectively determinable event. For example, if the ADS bonds were used to mitigate the impact on the SRF bond program of an underlying borrower default, the ability to defer would occur only in the event of a payment default by one or more underlying borrowers, and the delay risk might be further limited by requiring that the borrower payment defaults exceed some predetermined level.

If the ADS bonds are to be used to reduce the risk of a borrower default, a delay might be limited to circumstances in which the borrower has a shortfall in its revenues available for debt service that exceeds a predetermined level. However, the borrower would be required to raise revenues to pay the bonds on the ADS Payment Dates just as if the bonds were legally due on such dates, virtually eliminating the risk that the borrower would be unable to pay the bonds on the ADS Payment Dates. Since the ADS bonds would not legally mature on the dates when traditional bonds would have matured, the borrower's coverage of legally due debt service would be greater than if traditional bonds had been used.

Likewise, if the purpose of the ADS bonds was to reduce the borrower's revenue requirement, the condition for deferral could again be a revenue shortfall exceeding some predetermined level. However, the obligation to raise revenue would be at a lower level than would exist on the ADS Maturity Date. For example, if the borrower's rate covenant would generally require coverage of 1.20 times debt service, the borrower could be obligated to generate coverage of 1.10 or 1.05 times both debt service and ADS Payments.

In the examples above, the ability to defer amounts due on ADS Payment Dates would be limited to a default by an underlying borrower or a significant revenue deficiency (each in spite of the borrower having been obligated to establish rates at a sufficient level). Thus, the ADS Payment Dates are not merely expected payment dates but legally mandated payment dates. However, were a deferral to occur (in spite of the low probability of occurrence of an event permitting a deferral), all or a portion of the ADS Payments would be deferred, and there would not be a default relating to the ADS bonds. If revenues continued to be insufficient, the ADS Payments could be deferred until the ADS Maturity.

It is noted that for an underlying borrower to use ADS bond(s) in the SRF context, the underlying borrower's bond(s) would have to legally mature later than the expected payment dates of the ADS bond(s). For the expected payment dates to be the same as the maturity dates on traditional bonds, the borrower's ADS bond(s) might have to mature later than the permissible final maturity of an SRF loan, at least in the case of 30 year clean water loans and 20 year drinking water loans, for example. Nevertheless, it might be possible for the ADS Payment Dates to satisfy the maturity requirements for the SRF loan. More particularly, in the case of ADS bond(s) issued by the SRF bond program issuer to mitigate borrower default risk, the ADS Payment Dates would correspond to the maturity dates of the borrower's bond(s), which would comply with the SRF loan maturity requirements. The ADS Maturity Dates of the SRF bond program bond(s), however, could be later than the maturity dates of the borrower's bonds.

While a number of embodiments of the instant invention have been described, it is understood that these embodiments are illustrative only, and not restrictive, and that many modifications may become apparent to those of ordinary skill in the art. For example, the extension of payment of the OEC and/or ADS bond may come before or after the use of a DSRF (having it come before use of the DSRF would increase the credit value of the OEC and/or ADS bond to the issuer's other bonds). Further, the extension of payment of the OEC and/or ADS bond may apply to principal or interest or both. Further still, the OEC and/or ADS bond feature may be callable (by the issuer or OEC holder or ADS bond holder). Further still, the OEC and/or ADS bond feature could be callable by the issuer if the bond(s) achieve a particular underlying rating without regard to the OEC and/or ADS bond feature (for example, if the bond(s) achieve an underlying rating of "AAA" without regard to the OEC and/or ADS bond feature). Further still, the issuer may have the ability to shorten the maturity in exchange for a lower yield. Further still, different classes of OECs and/or ADS bonds related to the same underlying bond could be created (for example, Class 2 OECs and/or ADS bonds might be subject to payment deferral prior to any Class 1 OECs and/or ADS bonds; of course, Class 2 OECs and/or ADS bonds would receive a higher yield). Further still, the issuer may be required to pursue a takeout financing at or before the final maturity date. Further still, the issuer of the OEC and/or ADS bond may be provided with such limited flexibility that the issuer of the OEC and/or ADS bond may not be permitted to facilitate or allow any action that would cause (or fail to take any action that would prevent) any deterioration of the issuer's credit. Further still, the required coverage ratio may increase in the event that the issuer fails to pay debt service on the expected payment dates (in one example the required coverage ratio may increase up to the level required for legally due debt service). In one embodiment, the coverage ratio may go from 1.05 to 1.10 one year, from 1.10 to 1.15 the next year, and from 1.15 to 1.20 the following year. In another embodiment, the coverage ratio may increase at a different rate (e.g., the coverage ratio may increase quarterly). Further still, the OEC and/or ADS bond may be used in an SRF program. Further still, the methods described may be embodied in a software program and/or a computer system.

What is claimed is:

1. A method implemented by a programmed computer system, comprising:
   receiving with a computer system data regarding a bond to be issued by a bond issuer,
   wherein the bond is associated with a revenue stream, and
   wherein the received data includes a legal maturity date for the bond, an accelerated repayment date that precedes the legal maturity date, and a revenue rate expected to be generated by the revenue stream by the accelerated repayment date;
   calculating with the computer system the amount of the bond to be issued such that the revenue rate expected by the accelerated repayment date is sufficient to repay the bond by the accelerated repayment date and the amount of the bond to be issued also satisfies a first coverage ratio associated with repayment of the bond by the accelerated repayment date,
   wherein the first coverage ratio is (i) lower than a second coverage ratio associated with repayment of the bond solely by the legal maturity date, and (ii) greater than 1 and up to 1.2, and
   wherein the payment of the bond is at a deferral date as late as the legal maturity date to the extent that the repayment of the bond cannot be met by the accelerated repayment date due to the failure of the revenue stream to generate the revenue rate expected, and wherein the deferral is based at least in part upon the data regarding the legal maturity date and the revenue stream; and
   instructing an issuance of the bond based on the calculated amount to be issued.

2. The method of claim 1, wherein the revenue stream flows from a project selected from the group consisting of: i) an airport project; and ii) a sewer project.

3. The method of claim 1, wherein the revenue rates expected to be sufficient to repay the bond by the accelerated repayment date further comprises revenue rates expected to be sufficient to pay both a repayment obligation by the accelerated repayment date and legally payable debt service.

4. The method of claim 3, wherein the deferral of the payment of the repayment obligation occurs upon the occurrence of a determinable event.

5. The method of claim 4, wherein the determinable event is the existence of a shortfall between: i) the sum of the repayment obligation and legally payable debt service; and ii) revenues raised by the revenue rates.

6. The method of claim 1, wherein the revenue rates expected to be sufficient to repay the bond by the expected payment date is a continuing requirement even if the repayment obligation is deferred.

7. The method of claim 1, wherein the bond is issued as part of a pool of bonds.

8. The method of claim 7, wherein the pool of bonds is associated with a state revolving fund program.

9. The method of claim 1, wherein additional interest on a principal portion of the repayment which is not met by the accelerated repayment date continues to accrue until the principal portion of the repayment is met.

10. The method of claim 9, wherein the additional interest is paid using a mechanism selected from the group consisting of: i) accretion of principal to the principal portion of the repayment in the amount of the unpaid additional interest; ii)

direct payment of the additional interest; and iii) an increase in the interest rate on any unpaid part of the principal portion of the repayment calculated to result in a payment increase equal the additional interest.

11. The method of claim 10, wherein the increase in the interest rate on any unpaid part of the principal portion of the repayment increases in each year following accelerated repayment date.

12. The method of claim 1, wherein additional interest on an interest portion of the repayment which is not met by the accelerated repayment date continues to accrue until the interest portion of the repayment is met.

13. The method of claim 12, wherein the additional interest is paid using a mechanism selected from the group consisting of: i) accretion of principal to a principal portion of the repayment in the amount of the unpaid additional interest; ii) direct payment of the additional interest; and iii) an increase in the interest rate on any unpaid part of the principal portion of the repayment calculated to result in a payment increase equal the additional interest.

14. The method of claim 13, wherein the increase in the interest rate on any unpaid part of the principal portion of the repayment increases in each year following the accelerated repayment date.

15. The method of claim 1, wherein the revenue stream is a net revenue stream.

16. The method of claim 1, wherein the failure of the revenue stream to cover the requirements of the repayment obligation results from a force majure event.

* * * * *